(12) United States Patent
Guillon

(10) Patent No.: US 11,321,417 B2
(45) Date of Patent: May 3, 2022

(54) SYSTEM AND METHOD FOR BROWSER-BASED TARGET DATA EXTRACTION

(71) Applicant: AMADEUS S.A.S., Biot (FR)

(72) Inventor: Nicolas Guillon, Mouans-Sartoux (FR)

(73) Assignee: AMADEUS S.A.S., Biot (FR)

(*) Notice: Subject to any disclaimer, the term of this patent is extended or adjusted under 35 U.S.C. 154(b) by 189 days.

(21) Appl. No.: 16/863,162

(22) Filed: Apr. 30, 2020

(65) Prior Publication Data

US 2021/0286857 A1 Sep. 16, 2021

(30) Foreign Application Priority Data

Jun. 5, 2019 (FR) ...................................... 1905940

(51) Int. Cl.
| | |
|---|---|
| *G06F 3/00* | (2006.01) |
| *G06F 16/957* | (2019.01) |
| *G06F 16/955* | (2019.01) |
| *G06F 16/951* | (2019.01) |
| *G06F 16/908* | (2019.01) |
| *G06Q 30/06* | (2012.01) |
| *H04L 29/06* | (2006.01) |

(52) U.S. Cl.
CPC ........ *G06F 16/9577* (2019.01); *G06F 16/908* (2019.01); *G06F 16/951* (2019.01); *G06F 16/955* (2019.01); *G06Q 30/0601* (2013.01); *H04L 63/0807* (2013.01)

(58) Field of Classification Search
None
See application file for complete search history.

(56) References Cited

U.S. PATENT DOCUMENTS 7,979,457 B1 * 7/2011 Garman ............. G06Q 30/0625
707/768
9,262,754 B1 2/2016 Jawharkar
(Continued)

FOREIGN PATENT DOCUMENTS

WO WO2002073460 A2 9/2002

OTHER PUBLICATIONS

INPI, Search Report, dated Jan. 31, 2020, re France Patent Application No. FR1905940.

*Primary Examiner* — Thanh T Vu
(74) *Attorney, Agent, or Firm* — Perry + Currier

(57) ABSTRACT

A method of browser-based target data extraction includes: storing a browser application and a browser extension, the browser extension containing a predefined network identifier of a server; at a controller of the client computing device interconnected with the memory, executing the browser application to retrieve a web page containing target data; at the controller, responsive to retrieving the web page, executing the browser extension simultaneously with the browser application for: capturing a portion of the web page containing the target data; responsive to capturing the portion, automatically generating an overlay interface including the target data; controlling a display of the client computing device to present the overlay with the web page; receiving an operator command at the overlay via an input assembly of the client computing device; and when the operator command is a confirmation command, transmitting the target data to the server using the predefined network identifier.

19 Claims, 11 Drawing Sheets

(56) References Cited

U.S. PATENT DOCUMENTS

| | | | |
|---|---|---|---|
| 9,449,080 B1* | 9/2016 | Zhang | G06F 40/30 |
| 10,007,939 B2* | 6/2018 | Thomason | G06Q 30/0641 |
| 2010/0070851 A1* | 3/2010 | Chen | G06F 16/986 |
| | | | 715/236 |
| 2012/0010995 A1* | 1/2012 | Skirpa | G06F 16/95 |
| | | | 705/14.49 |
| 2012/0173988 A1* | 7/2012 | Tran | G06F 16/9566 |
| | | | 715/738 |
| 2014/0364158 A1* | 12/2014 | Hwang | H04W 4/185 |
| | | | 455/466 |
| 2018/0025397 A1* | 1/2018 | Kuruvila | G06Q 30/04 |
| | | | 705/40 |
| 2018/0295087 A1 | 10/2018 | Bookatz et al. | |

* cited by examiner

SYSTEM AND METHOD FOR BROWSER-BASED TARGET DATA EXTRACTION

CROSS-REFERENCE TO RELATED APPLICATION

This application claims priority from French patent application no. 1905940, filed Jun. 5, 2019, the contents of which is incorporated herein by reference.

FIELD

The specification relates generally to data processing, and specifically to a system and method for browser-based target data extraction.

BACKGROUND

Various entities, such as corporation and other organizations, may implement expense reimbursement programs. Such programs, in general, reimburse individuals associated with the organization for certain expenses incurred by the individuals. Examples of reimbursable expenses include travel, supplies associated with the individuals' activities on behalf of the organization, and the like.

Such programs typically require expenses to be submitted for review and approval prior to reimbursement. Due to the prevalence of electronic commerce, many expenses are represented in web pages or other electronic documents delivered to computing devices operated by the individuals incurring the expenses. The individuals are then required, in order to submit expenses for review and reimbursement, to manually print or otherwise retrieve expense data from the electronic documents. Individuals are also then required to manually submit the expense data for review and reimbursement (e.g. by attaching a document to an email, submitting a hard copy, or the like). The submission process is therefore time-consuming, as well as prone to inadvertent errors or deliberate manipulation of the data prior to submission.

SUMMARY

An aspect of the specification provides a method of browser-based target data extraction at a client computing device, the method comprising: storing, in a memory of the client computing device, a browser application and a browser extension, the browser extension containing a predefined network identifier of a server; at a controller of the client computing device interconnected with the memory, executing the browser application to retrieve a web page containing target data; at the controller, responsive to retrieving the web page, executing the browser extension simultaneously with the browser application for capturing a portion of the web page containing the target data; responsive to capturing the portion, automatically generating an overlay interface including the target data; controlling a display of the client computing device to present the overlay with the web page; receiving an operator command at the overlay via an input assembly of the client computing device; and when the operator command is a confirmation command, transmitting the target data to the server using the predefined network identifier.

In an embodiment, the method further comprises, at the controller via execution of the browser extension, when the operator command is a rejection command, ceasing display of the overlay and discarding the target data, without transmitting the target data to the server. In another embodiment, the method further comprises, at the controller via execution of the browser extension, prior to the capturing, detecting a feature of the web page indicating that the web page contains the target data. In another embodiment, the method further comprises storing in the memory, in association with the browser extension, a predefined tag corresponding to the target data, wherein detecting the feature includes examining metadata of the web page to detect the predefined tag, and wherein capturing the target data includes retrieving a portion of the metadata associated with the predefined tag. In another embodiment, the method further comprises storing in the memory, in association with the browser extension, a predefined web page attribute indicating the presence of the target data, wherein detecting the feature includes examining a document object model (DOM) of the web page to detect the predefined web page attribute, and wherein capturing the target data includes retrieving a portion of the DOM. In another embodiment, the predefined web page attribute includes at least one of a domain of the web page and a title of the web page.

In an embodiment, capturing the portion of the web page includes, via execution of the browser extension receiving a capture command via the input assembly, receiving a selection of the portion of the web page via the input assembly, and capturing the selected portion. In another embodiment, the target data includes invoice data defining a price payable to a vendor for supplying a product to a customer associated with the client computing device. In another embodiment, the method further comprises, prior to receiving the operator command, receiving input data at the overlay altering the target data prior to transmission to the server. In another embodiment, the method further comprises, at the controller via execution of the browser extension, prior to generating the overlay, transmitting a parsing request to the server including the capture portion of the web page, and receiving the target data from the server. In another embodiment, the method further comprises, at the controller via execution of the browser extension, prior to generating the overlay, parsing the captured portion of the web page to extract the target data.

Another aspect of the specification provides a client computing device, the client computing device comprising: a memory storing a browser application and a browser extension, the browser extension containing a predefined network identifier of a server, a display, an input assembly, and a controller interconnected with the memory, the display and the input assembly. The controller is further configured to perform the method described herein.

Another aspect of the specification provides a system for browser-based target data extraction, the system comprising: a client computing device including a memory storing a browser application and a browser extension, the browser extension containing a predefined network identifier of a server, a display, an input assembly, and a controller interconnected with the memory, the display and the input assembly. The controller is further configured to perform the described herein. The system further comprises a server corresponding to the predefined network identifier. The server comprises a communication interface and a processor is further configured to receive the target data from the client computing device, generate an electronic receipt according to the target data, and transmit the electronic receipt to an expense subsystem.

In an embodiment, the processor is further configured to generate and transmit a confirmation message to the client computing device responsive to transmitting the electronic receipt to the expense subsystem, and wherein the controller of the client computing device is further configured to control the display to present the confirmation message at the overlay. In another embodiment, the processor is further configured, prior to receiving the target data from the client computing device, to receive a parsing request containing the captured portion of the web page, parse the captured portion to extract the target data, and return the target data to the client computing device for display via the overlay. In another embodiment, the processor is configured, in order to parse the captured portion of the web page, to transmit the captured portion of the web page to an auxiliary server for parsing. In another embodiment, the processor is further configured, responsive to receiving the parsing request, to detect a network address of a target document in the captured portion, and to retrieve the target document from a vendor server. In another embodiment, the controller of the client computing device is further configured, via execution of the browser extension, to transmit an authentication request to the server. In another embodiment, the processor of the server is further configured, responsive to receiving the authentication request, to generate and transmit an authentication token to the client computing device.

BRIEF DESCRIPTIONS OF THE DRAWINGS

Embodiments are described with reference to the following figures, in which.

DETAILED DESCRIPTION

Figure 1:
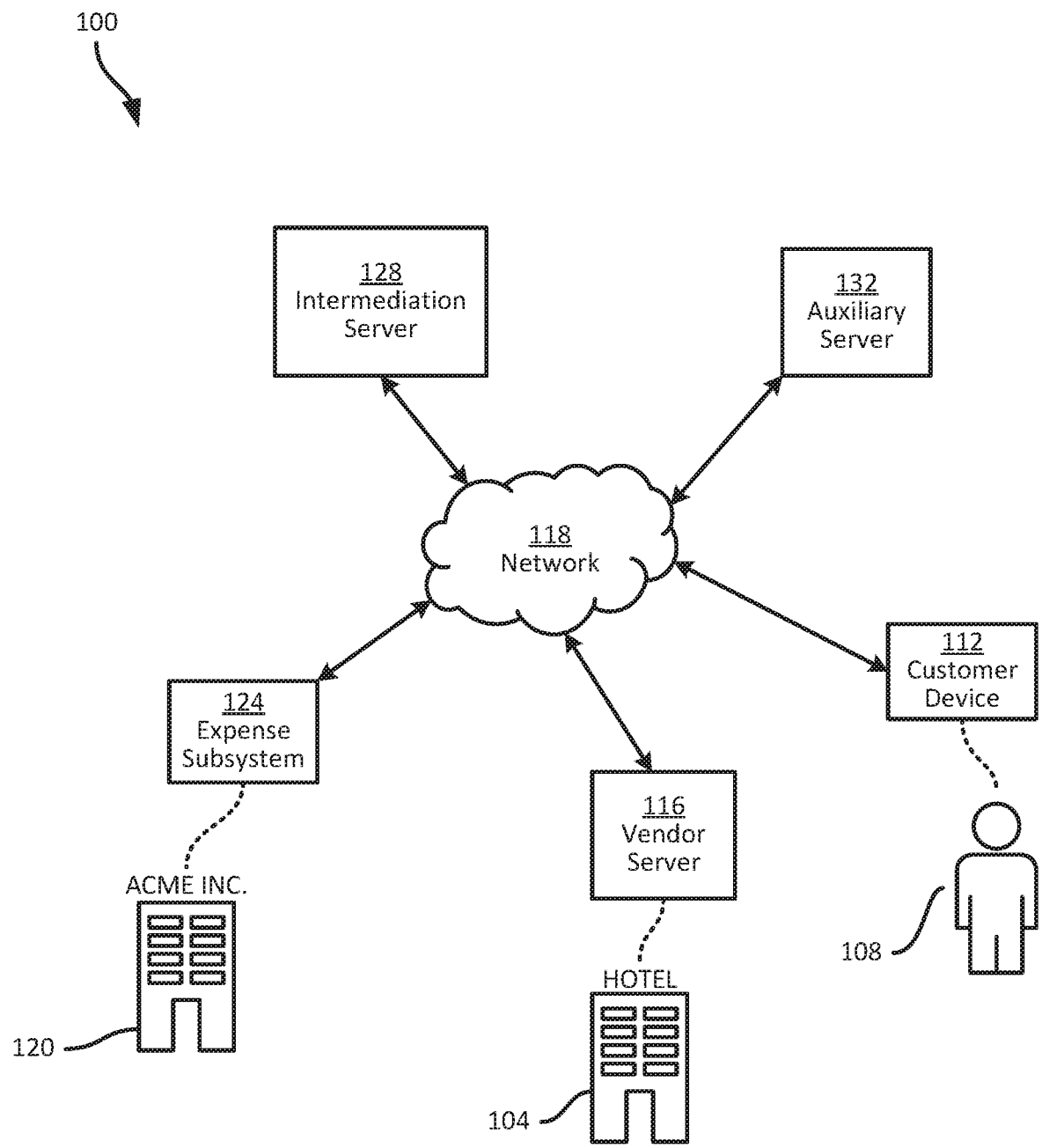
FIG. 1 illustrates a system for browser-based target data extraction.

FIG. 1 depicts a system 100 for browser-based target data extraction. In the examples discussed herein, the target data is invoice data defining a transaction, such as the purchase of products (i.e. goods and/or services) from a vendor entity 104 by a customer 108. The vendor 104, in the present example, is a hotel operator and the products purchased by the customer 108 may therefore be lodging in hotel rooms. As will be apparent to those skilled in the art, however, a wide variety of vendors may provide a wide variety of products to the customer 108. As will also be apparent, although a single vendor 104 and a single customer 108 are illustrated in FIG. 1, the functionality of the system 100 discussed herein may be applied to any suitable numbers of vendors 104 and customers 108.

The above-mentioned transactions, in the examples discussed herein, are initiated by the customer 108 via operation of a customer computing device 112 (e.g. a desktop computer, a mobile computing device such as a smart phone, laptop computer, tablet computer or the like), also referred to herein simply as a customer device 112. Specifically, the customer device 112 is operated by the customer 108 to communicate with a vendor server 116 associated with the vendor 104, over a network 118. The vendor server 116 hosts a website through which the above-mentioned transactions can be completed. Upon completion of a transaction, the customer device 112 typically receives, from the vendor server 116, a confirmation web page containing the above-mentioned invoice data.

The customer 108 may be associated with a payer entity 120, such as a corporation (e.g. the employer of the customer 108, or the like) or other organization. Certain transactions initiated by the customer 108 may be reimbursable to the customer 108 by the payer entity 120, which operates (or which another entity operates on behalf of the payer entity 120) an expense subsystem 124 to manage the collection and reimbursement of such transactions. As will be apparent to those skilled in the art, the system 100 may include any suitable number of expense subsystems 124 associated with distinct payer entities.

The expense subsystem 124, which may also be referred to as an Expense Management System (EMS) 124, is implemented as any suitable one or combination of computing devices (e.g. servers, desktop computers or the like). In order for the customer 108 to obtain reimbursement, however, the invoice data received at the customer device 112 from the vendor server 116 must be provided to the EMS 124 for further processing (e.g. for review and approval of the expense, whether manually or via an automated process).

To that end, the system 100 implements certain functionality to facilitate the extraction of the invoice data at the customer device 112, and the provision of the invoice data to the EMS 124. In particular, the above-mentioned functionality enables at least partial automation of the extraction of invoice data and of the provision of the invoice data to the EMS 124, despite the wide variety of forms in which the vendor server 116 may provide the invoice data to the customer device 112.

More specifically, the customer device 112 is provided with a browser extension, to be discussed in greater detail below, configured to detect the presence of target data such as the above-mentioned invoice data in web pages received at the customer device 112. The system 100 also includes an intermediation server 128 configured to receive data from the customer device 112 via the browser extension. The customer device 112 and the intermediation server 128 are configured to interact in order to validate the invoice data, and the intermediation server 128 is then configured to transmit the invoice data to the EMS 124 (or to any other EMS, when the system includes multiple EMSs). The system 100 also includes, in the present example, an auxiliary server 132 configured to perform certain processing of the invoice data on behalf of the intermediation server 128.

As will be apparent to those skilled in the art throughout the discussion below, the functionality implemented by the system 100 is suitable for the browser-based extraction of various types of data beyond the invoice data discussed in the examples herein. That is, the system 100 can also be deployed to extract any of a variety of other types of data from web pages retrieved at the customer device 112 for provision to a subsystem in the place of the EMS 124. For example, the system 100 can be deployed to detect and extract booking or reservation data corresponding to hotel reservations, car rentals, and the like, and to provide such data to a travel management subsystem (e.g. an online booking tool, OBT) associated with a corporate entity. In further examples, the system 100 can be deployed to detect and extract data defining restaurant reservations or other events, and to provide such data to a calendaring subsystem. In still further examples, the system 100 can be deployed to detect and extract data defining a document (e.g. a link to an electronic document in a web page and to provide the document to a cloud storage subsystem.

More generally, as will now be apparent to those skilled in the art, the system 100 enables the capture of data from any of a wide variety of web-based sources and the provision of such data to a particular subsystem without requiring that the web-based sources and the subsystem be reconfigured to interact with each other.

Figure 2A:
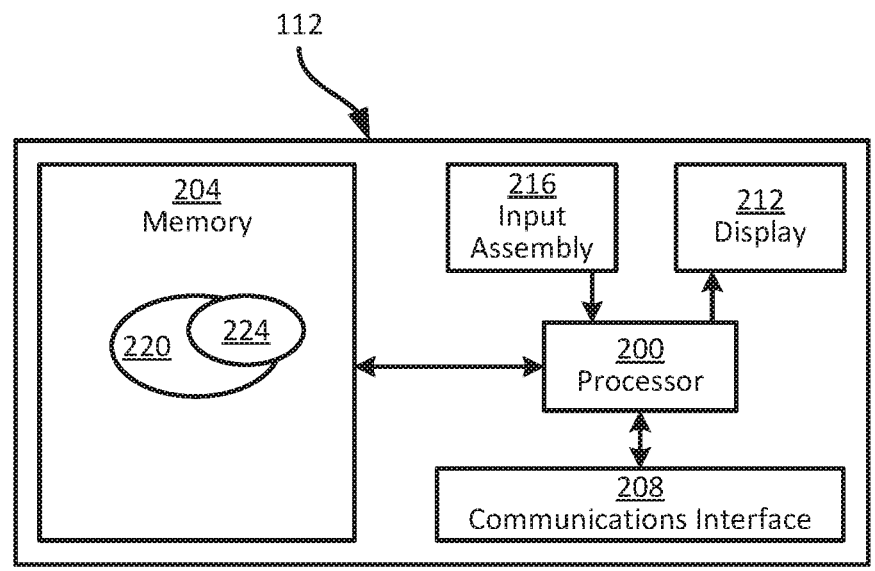
FIG. 2A illustrates certain components of the customer device of FIG. 0.1.
Figure 2B:
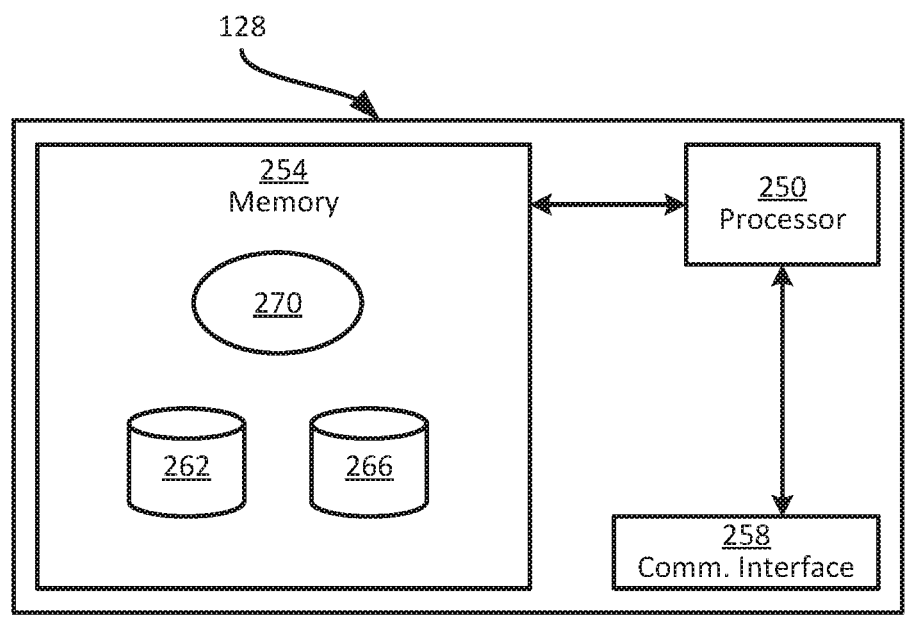
FIG. 2B illustrates certain components of the intermediation server of FIG. 0.1.

Turning now to FIGS. 2A and 2B, before discussing the functionality of the system 100 in greater detail, certain components of the customer device 112 and the intermediation server 128 will be discussed in greater detail.

Referring first to FIG. 2A, the customer device 112 includes at least one processor 200, such as a central processing unit (CPU) or the like. The processor 200 is also referred to herein as a controller 200 to more readily distinguish between the processor 200 and a processor of the intermediate server 128, discussed below. The controller 200 is interconnected with a memory 204, implemented as a suitable non-transitory computer-readable medium (e.g. any suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The customer device 112 also includes a communications interface 208 interconnected with the processor 200. The communications interface 208 enables the customer device 112 to communicate with the other computing devices of the system 100 via the network 118. The communications interface 208 therefore includes any necessary components (e.g. network interface controllers (NICs), radio units, and the like) to communicate via the network 118. The specific components of the communications interface 208 are selected based on upon the nature of the network 118.

The customer device 112 further includes a display 212 controllable by the processor 200 to present information thereon. The display 212 can be based on any suitable display panel technology, including for example, an Active Matrix Organic Light Emitting Diodes (AMOLED)-based display panel. The customer device 112 also includes an input assembly 216 configured to receive input from the customer 108 and provide data representing the input to the processor 200. The input assembly can include any one of, or any suitable combination of, a keypad, a touch screen (e.g. integrated with the display 212), a keyboard and/or mouse, and the like. The components of the customer device 112 are typically contained in a housing, although in some form factors, certain components can be supported in separate housings (e.g. the display 212 and input assembly 216).

The memory 204 also stores a plurality of computer-readable programming instructions, executable by the controller 200, in the form of various applications. The applications stored in the memory 204 include a browser application 220 (i.e. any suitable web browser, various examples of which will occur to those skilled in the art) and a browser extension 224. As illustrated in FIG. 2A, the browser extension 224 is not an independently executable application, but is rather an additional component of the browser application 220 that makes use of an application programming interface (API) exposed by the browser application 220. As will be discussed in greater detail below, execution of the browser application 220 enables the customer device 112 to interact with the vendor server 116 to obtain web pages containing target data. The extension 224 enables the customer device 112 to perform additional actions (beyond those enabled by the browser 220 itself) with respect to the web pages obtained from the vendor server 116. The extension 224 also enables the customer device 112 to interact with the intermediation server 128 in order to detect and extract the above-mentioned target data. The extension 224 may be implemented in various suitable structures. For example, the extension 224 can include a content component that manipulates web pages within the browser 220, and a background component that employs the browser 220 to communicate with the server 128.

As will be understood by those skilled in the art, the processor 200 executes the instructions of the applications 220 and 224 (as well as any other suitable applications stored in the memory 204) in order to perform various actions defined by the instructions contained therein. In the description below, the processor 200, and more generally the customer device 112, are said to be configured to perform those actions. It will be understood that they are so configured via the execution (by the processor 200) of the instructions of the applications stored in memory 204.

Referring to FIG. 2B, the intermediation server 128 includes at least one processor 250, such as a central processing unit (CPU) or the like. The processor 250 is interconnected with a memory 254, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 250 and the memory 254 are generally comprised of one or more integrated circuits (ICs).

The server 128 also includes a communications interface 258 interconnected with the processor 250. The communications interface 258 enables the server 128 to communicate with the other computing devices of the system 100 via the network 118. The communications interface 258 therefore includes any necessary components (e.g. network interface controllers (NICs), radio units, and the like) to communicate via the network 118. The specific components of the communications interface 208 are selected based on upon the nature of the network 118. The server 128 can also include input and output devices (not shown) connected to the processor 200, such as keyboards, mice, displays, and the like.

The components of the server 128 mentioned above can be deployed in a single enclosure, or in a distributed format. In some examples, therefore, the intermediate server 128 includes a plurality of processors, either sharing the memory 254 and communications interface 258, or (e.g. when geographically distributed but logically associated with each other) each having distinct corresponding memories and communications interfaces.

The memory 254 stores a profile repository 262 and a target data repository 266, also referred to herein as an invoice repository 266 in the examples below. The profile repository 262 stores identifiers corresponding to customer devices (including the customer device 112) and identifiers of associated EMSs (e.g. indicating an association between the customer device 112 and the EMS 124). The invoice repository 266 stores invoice data, including data extracted from web pages obtained by the customer device 112, and in some examples supplementary invoice data obtained by the intermediation server 128 from the auxiliary server 132 or the vendor server 116.

The memory 254 also stores a plurality of computer-readable programming instructions, executable by the processor 200, in the form of various applications. The applications stored in the memory 254 include an orchestrator application 270, execution of which configures the server 128 to interact with the customer device 112, the auxiliary server 132 and the vendor server 116 to obtain invoice data, and to transmit the invoice data to the EMS 124.

Figure 3:
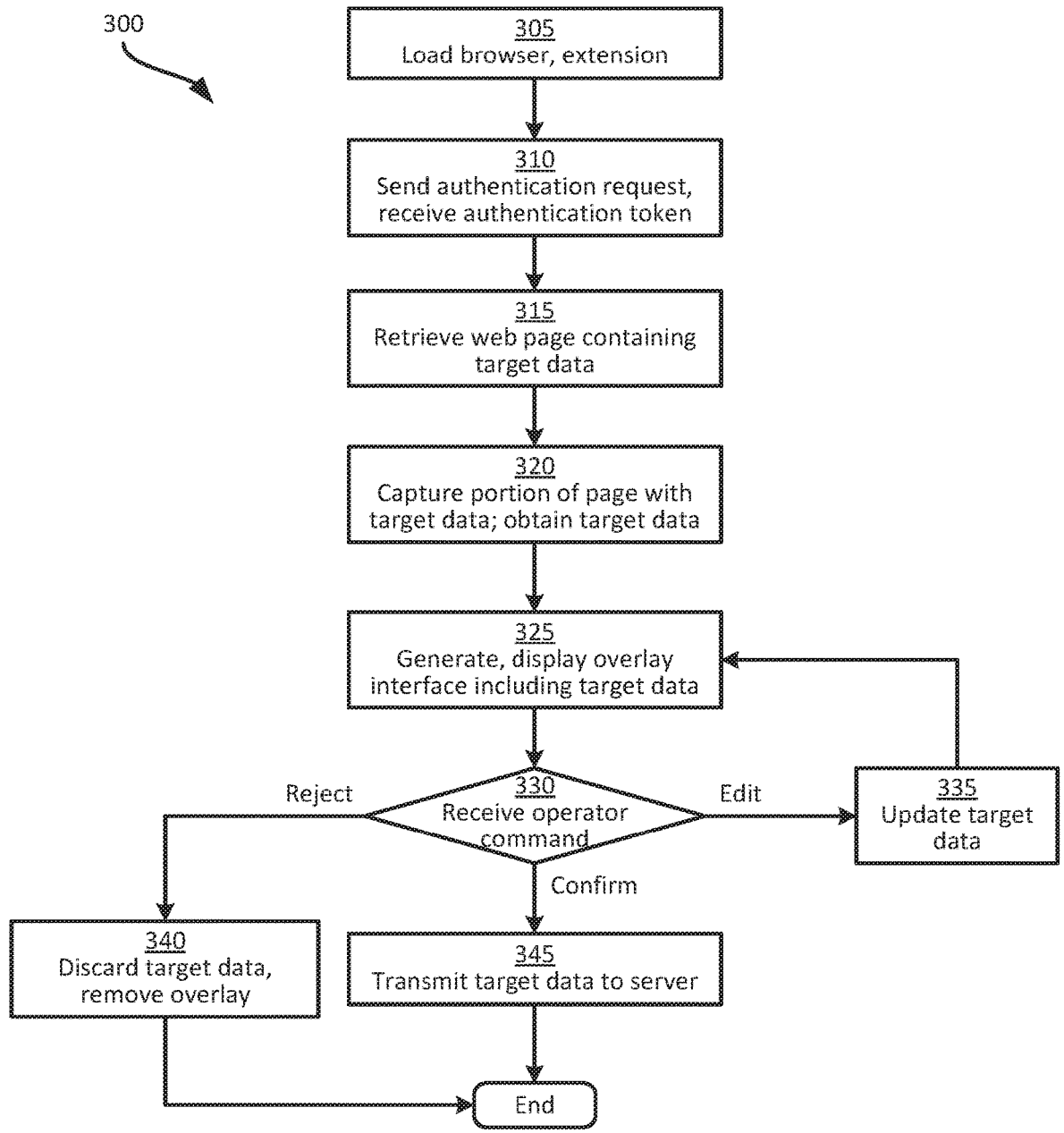
FIG. 3 illustrates a method of browser-based target data extraction at the customer device of FIG. 1.
Figure 4:
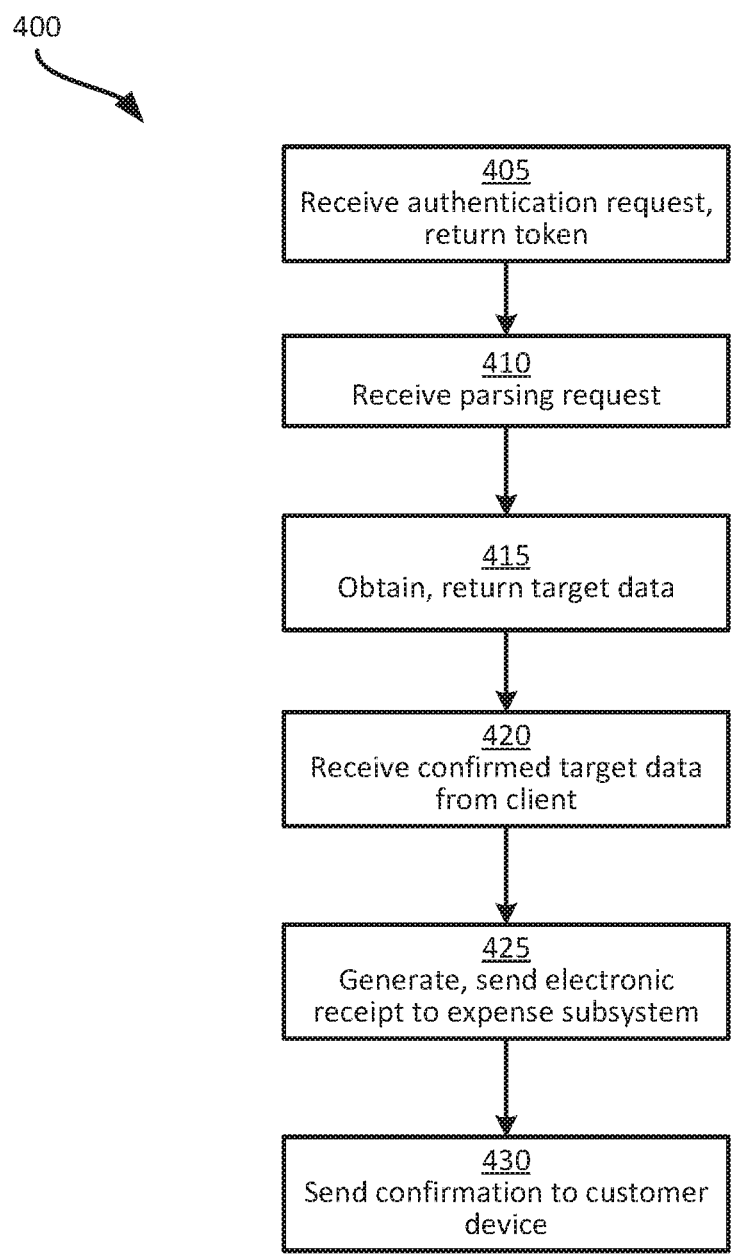
FIG. 4 illustrates a method of browser-based target data extraction at the intermediation server of FIG. 1.

Turning now to FIGS. 3 and 4, certain aspects of the operation of the system 100 will be described in greater detail. Specifically, FIG. 3 illustrates a method 300 of browser-based target data extraction performed at the customer device 112 via execution of the browser 220 and the extension 224. FIG. 4, meanwhile, illustrates a method 400 of target data extraction performed at the intermediation server 128 via execution of the application 270. The performances of the methods 300 and 400 by the customer device 112 and the intermediation server 128, respectively, will be discussed in tandem below.

Beginning at block 305 of the method 300, the customer device 112 is configured to begin execution of the browser 220 and the extension 224. At block 310, the extension 224 is configured to transmit an authentication request to the intermediation server 128. To that end, the extension 224 stores a network identifier of the intermediation server 128 (e.g. an Internet Protocol (IP) address, a domain name or the like) with which to make the request at block 310. The extension 224 also stores authentication credentials, such as an account identifier and a password. In other examples, the extension 224 can generate a prompt for presentation on the display 212 within a graphical interface generated via execution of the browser 220, to request that the customer 108 enter such credentials using the input assembly 216.

Responsive to receiving the authentication credentials, or retrieving the credentials from the memory 204, the extension 224 causes the browser 220 to transmit the above-mentioned authentication request containing the authentication credentials. For example, the request at block 310 can be transmitted according to an API implemented by the intermediation server 128. Such an API may, for example, provide a login call accepting authentication credentials as parameters. Responsive to the request, the extension 224 receives and stores an authentication token from the intermediation server 128.

Referring to FIG. 4, at block 405 the intermediation server 128 is configured, responsive to receiving the authentication request sent by the customer device 112 at block 310, to obtain and return the authentication token to the customer device 112. For example, the intermediation server 128 can be configured to store authentication credentials in the repository 262, and to verify that the credentials received in the request match those in the repository 262. The intermediation server 128 can be configured to generate and return the authentication token to the customer device 112. In other examples, rather than storing credentials and generating tokens locally, the intermediation server 128 is configured to pass the credentials to the EMS 124 associated with the customer device 112. The EMS 124 itself is then configured to validate the credentials and provide the token to the intermediation server 128 for transmission to the customer device 112.

Table 1 below illustrates an example profile record stored in the repository 262, illustrating authentication credentials (account ID and password) for a given customer 108, as well as a network identifier of the corresponding EMS for the customer 108 (in this case, the EMS 124). As noted above, the authentication credentials shown below can be stored at the EMS 124 rather than the intermediation server 128. That is, the contents of the profile repository 262 can be divided between the EMS 124 and the intermediation server 128 in other implementations.

TABLE 1

| Example Profile Repository 262 | | |
|---|---|---|
| Account ID | Password | EMS ID |
| Cust112 | ******* | EMS124.com |
| ... | ... | ... |

Returning to FIG. 3, if the authentication process discussed above fails, the performance of the method 300 ends. If the authentication process is successful, it is contemplated that although the performance of block 310 is shown only once in FIG. 3, the performance of block 310 can be repeated periodically throughout the performance of the method 300, e.g. to renew the authentication token. For example, the authentication token can have a predefined expiry time, and the extension 224 can be configured to repeat the request at block 310 before the expiry time has elapsed.

At block 315, having successfully completed the authentication at block 310, the customer device 112 is configured, via execution of the browser 220, to retrieve a web page containing target data. For example, the browser 220 can be configured to interact (as a result of input data received via the input assembly 216) with the vendor server 116 to initiate a transaction to purchase products such as the hotel room reservation mentioned above. Upon completion of the transaction, the customer device 112 typically receives from the vendor server 116 a confirmation web page containing information summarizing the transaction.

Figure 5:
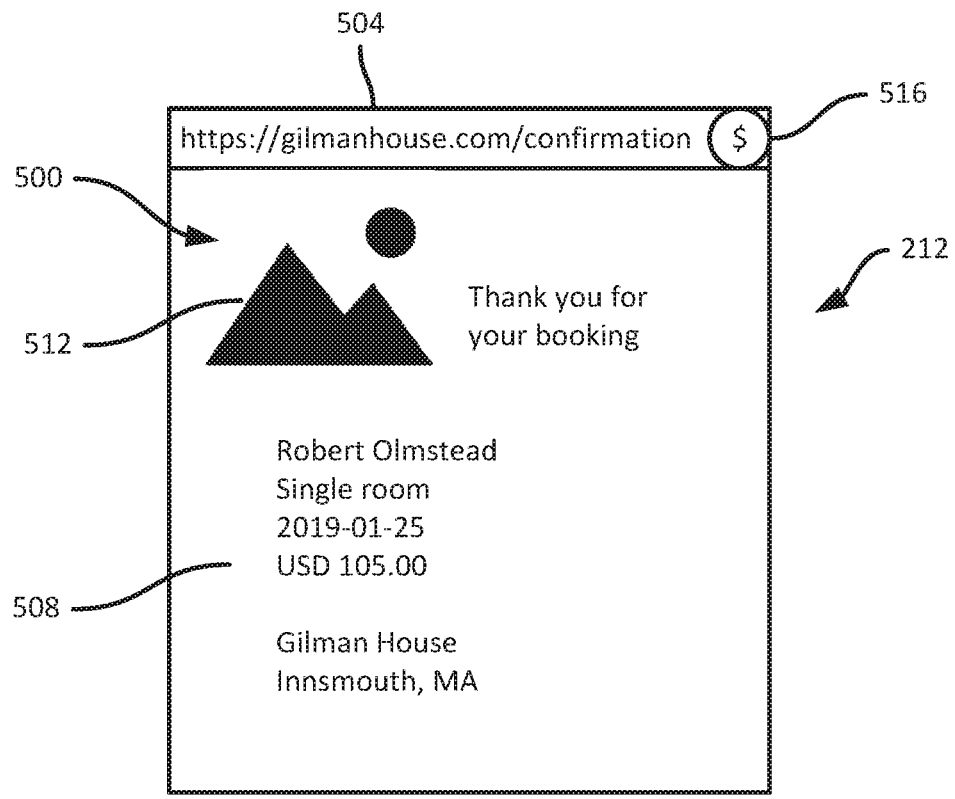
FIG. 5 illustrates an example web page processed via the method of FIG. 3.

FIG. 5 illustrates an example web page 500 retrieved at block 315 by the customer device 112, as presented on the display 212 via execution of the browser 220. The web page 500, in general, is a confirmation page retrieved from the vendor server 116 by the customer device 112 following completion of a transaction booking a hotel room. A uniform resource locator (URL) 504 corresponding to the web page 500 is presented by the browser 220. The web page 500 itself includes target data 508 defining the transaction (i.e. identifying the customer 108, the vendor 104, the product purchased and the price paid for the product). The web page 500 can also include non-target data (i.e. data that does not define the transaction) 512, which in the illustrated example includes an image and the string "Thank you for your booking". Also shown in FIG. 5, and discussed in greater detail below, is a selectable capture element 516 rendered in the browser window by the extension 224.

Returning to FIG. 3, at block 320 the customer device 112 is configured to capture, from the web page 500 retrieved at block 315, a portion of the web page 500 containing the target data. As will be apparent in the discussion below, vendor web pages including the web page 500 may present target data in a wide variety of formats, each of which may be amenable to automated detection of the target data to greater or lesser extents. The customer device 112 is therefore also configured to obtain (i.e. to extract, or to request extraction) the target data from the captured portion of the web page 500. Once extracted, the target data from any vendor web page is presented according to a common predetermined format, such as a JavaScript Object Notation (JSON) object containing a predetermined set of target data fields.

The extension 224 can deploy one or more distinct mechanisms to capture the web page portion and extract the target data therefrom, with the selection of mechanism for a given vendor web page depending on the nature of that particular vendor web page. The above-mentioned mechanisms are discussed below in connection with FIG. 6.

Figure 6:
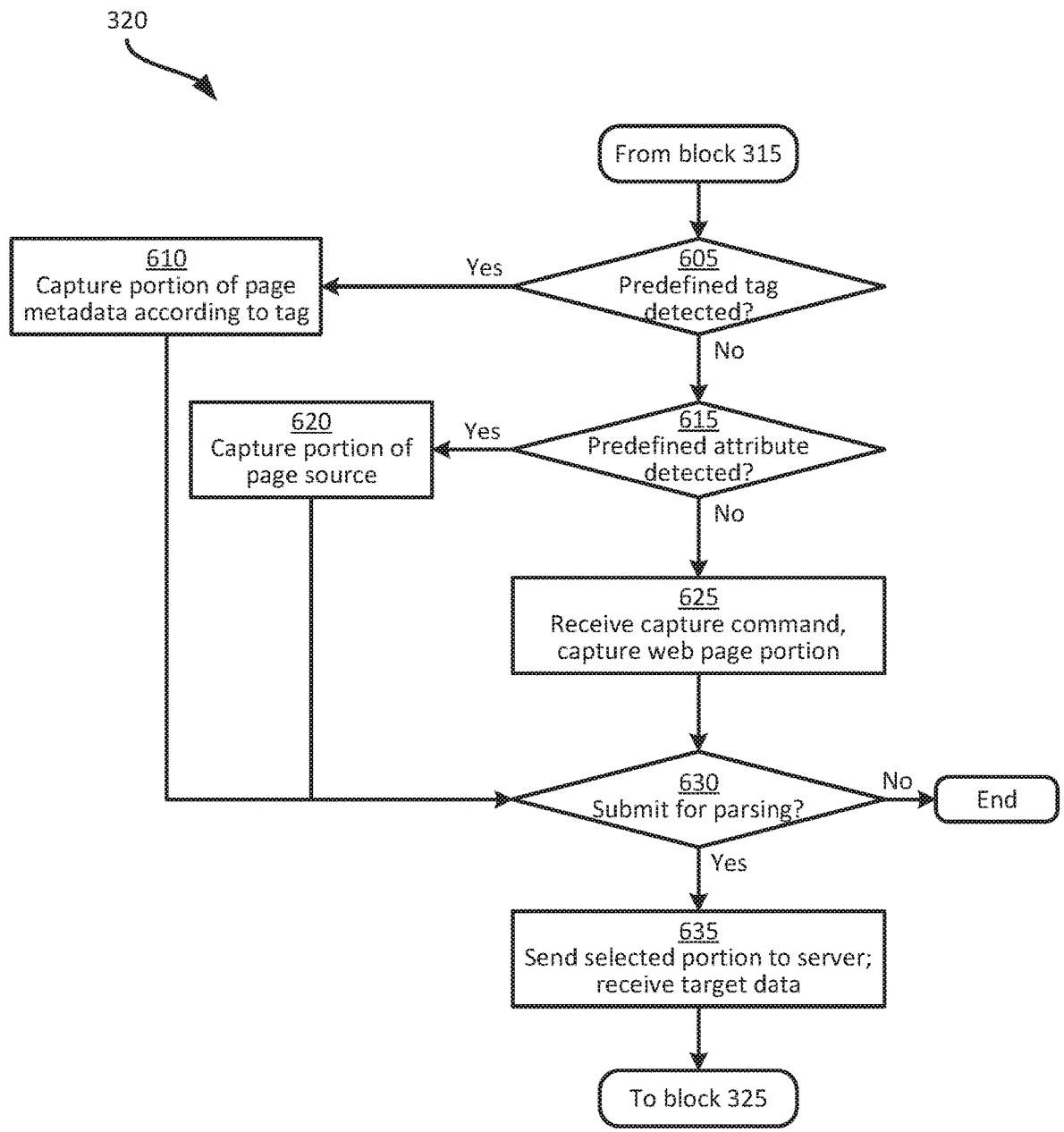
FIG. 6 illustrates a method of performing block 320 of the method of FIG. 3.

FIG. 6 illustrates an example method of performing block 320 of the method 300 at the customer device 112. In brief, the method illustrated in FIG. 6, implemented by the extension 224, enables the customer device 112 to obtain target data from a variety of vendor web pages, accommodating differences in the formatting of vendor web pages. Two of the mechanisms discussed below include the detection of a predefined feature of the web page, an indication of which can be stored in the memory 204 in association with the extension 224 (e.g. as a parameter within the extension 224 itself). A third mechanism enables the extension 224 to receive input (e.g. via the input assembly) from the customer 108 specifying a portion of the web page 500 to capture.

Figure 7:
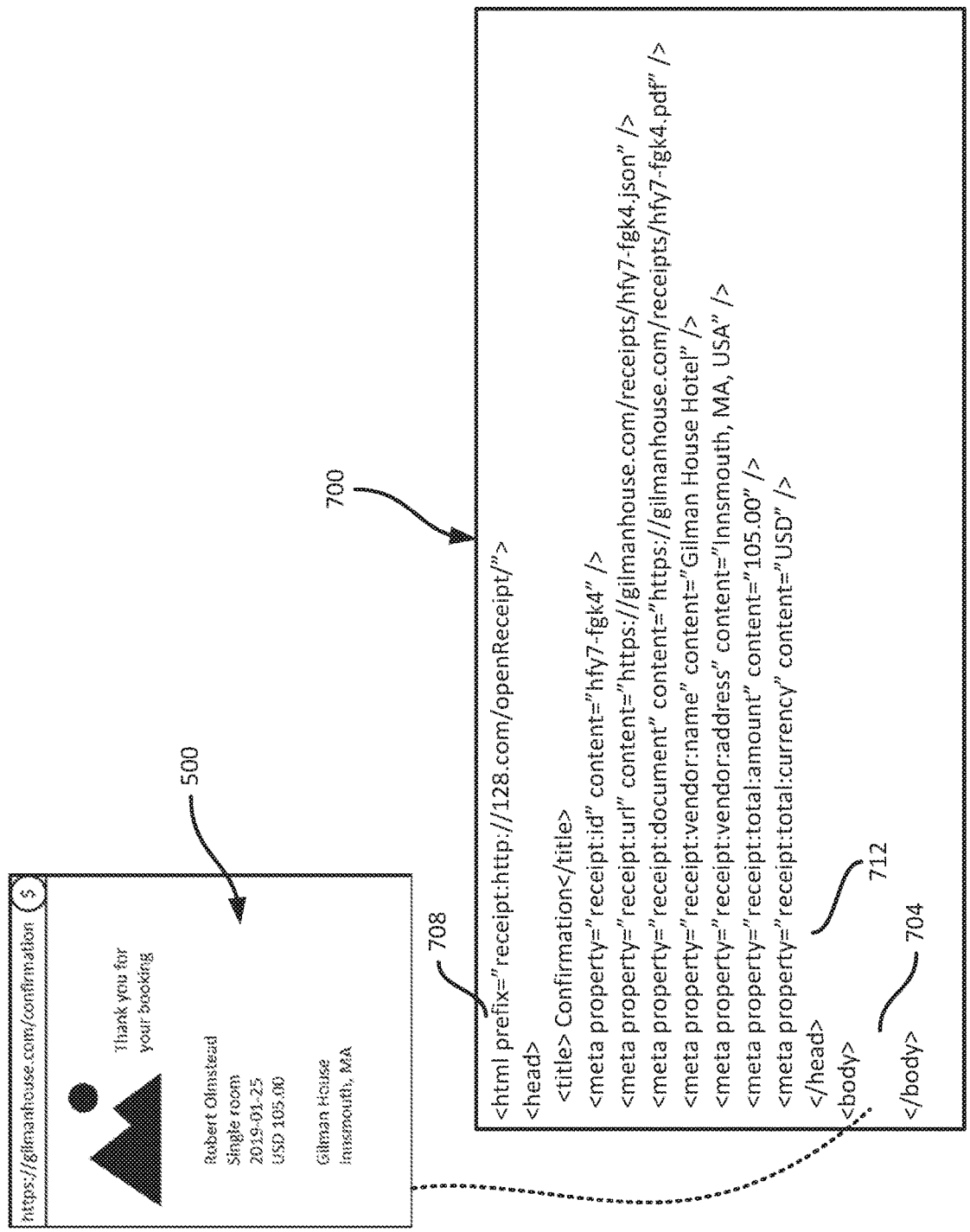
FIG. 7 illustrates a mechanism of capturing portions of the web page of FIG. 5 containing target data via the method of FIG. 6.

At block 605, the extension 224 determines whether the web page 500 contains a feature in the form of a predefined metadata tag. The extension 224 is therefore configured to examine the source document or documents (e.g. Hyper Text Markup Language (HTML) documents) to determine whether the predefined metadata tag is present therein. Turning to FIG. 7, an example page source 700 for the web page 500 is illustrated. The source 700 contains a body portion 704 defining the visible content of the web page 500 (i.e. the content rendered on the display 212 via execution of the browser 220). The source 700 also contains metadata, which is typically not rendered on the display 212. The metadata includes, in the illustrated example, a document tag 708 indicating that the source 700 is an HTML document, as well as a header block encompassed by the <head> and </head> tags.

In the present example, the extension 224 is configured to inspect the page source 700 for the presence of "meta" tags in the header 712 at block 605. In other examples, the extension 224 can be configured to inspect the source 700 for a document tag 708 that contains the "prefix" attribute identifying an invoice data syntax, indicated by the string "receipt:http://128.com/openReceipt/" in the present example.

When the determination at block 605 is affirmative, at block 610 the extension 224 is configured to capture the portion of the web page 500 containing the above-mentioned "meta" tags. That is, the extension 224 stores both a predefined tag to search for, and an indication of which portions of the web page to capture when the predefined tag is located. As will be apparent from FIG. 7, the meta tags in the header 712 contain a structured definition of the information presented on the display 212, including an identifier of the vendor (the Gilman House Hotel), indications of the price, currency and the like. As will now be apparent, the metadata in the page source can also include various other parameters, including a date of purchase, a name of the customer 108, and the like.

Referring again to FIG. 6, processing of the metadata captured at block 610 will be described further below, after a description of the other two capture mechanisms implemented to capture portions of the web page 500. As will be apparent to those skilled in the art, the use of predefined tags to both indicate that a web page contains target data and to enable capture of the relevant portion of the web page (i.e. the portion containing the target data) requires that the vendor 104 implement such tags in the web page 500. Any number of vendors may implement tags according to the same underlying protocol, and the extension 224 can maintain a single ruleset defining the predefined tag that indicates the presence of target data, as well as the predefined metadata portions to capture. When a vendor has not implemented tags as set out above, the other capture mechanisms implemented by the extension 224 may still be employed to capture target data.

When the determination at block 605 is negative (that is, when the source of the web page 500 does not contain the above-mentioned predefined tag), the extension 224 proceeds to block 615. At block 615, the extension 224 determines whether the web page 500 contains a predefined attribute that indicates the presence of target data. The predefined attribute, in this example, includes one or more features of the web page 500, e.g. identified as components of the document object model (DOM) of the web page 500.

Figure 8:
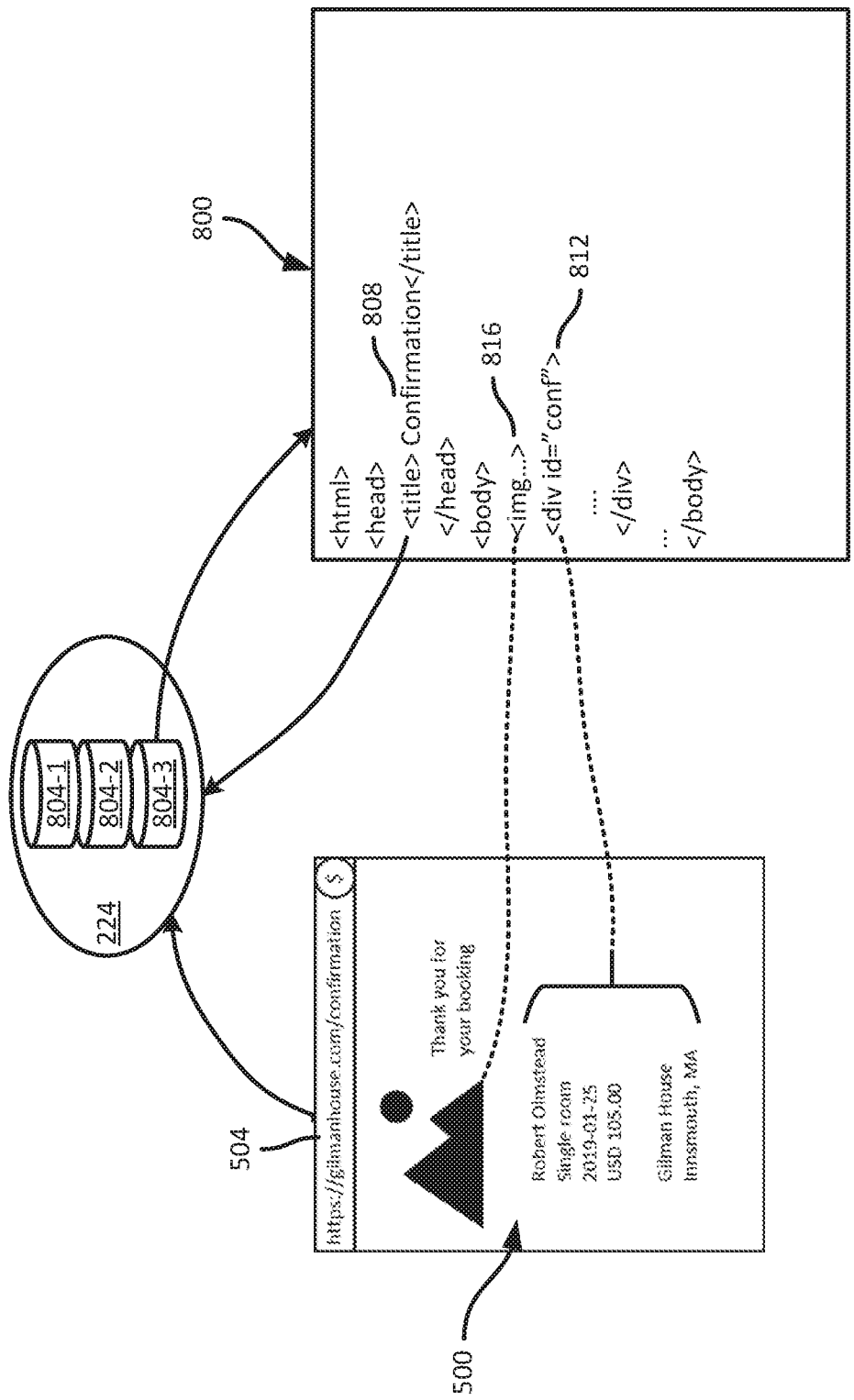
FIG. 8 illustrates another mechanism of capturing portions of the web page of FIG. 5 containing target data via the method of FIG. 6.

FIG. 8 illustrates another example source 800 for the web page 500, which does not contain the metadata tags described in connection with FIG. 7. The predefined attribute(s) noted above are typically specific to a given vendor 104 (i.e. to a given vendor server 116), and thus the extension 224 may store, as shown in FIG. 8, a plurality of rulesets 804 (examples 804-1, 804-2 and 804-3 are shown) each corresponding to a distinct vendor server 116. The rulesets 804 each define the predefined attribute(s) that indicate the presence of target data in the web page 500. In the present example, it is assumed that each ruleset 804 defines predefined attributes including a domain name retrieved from the URL 504 and a page title 808 identified in a "title" tag in the page source 800. A wide variety of other predefined attributes can be defined by the rulesets 804. For example, a ruleset 804 can contain one or more regular expression (regexp) definitions specifying strings to be detected in the web page 500. Such definitions can indicate strings to be detected in the URL of the web page 500, metadata of the web page 500, and the like.

The extension 224 therefore retrieves the domain name and page title, and determines whether the domain name and page title match those specified by any of the rulesets 804. When the domain name and page title match a ruleset (e.g. it is assumed that the ruleset 804-3 contains the predefined domain "gilmanhouse.com" and the predefined title "Confirmation", the extension 224 is configured to proceed to block 620 and capture a portion of the web page defined by the relevant ruleset 804. For example, the ruleset 804-3 specifies, in the present example, a portion of the DOM for capture in the form of a "div" element 812 having the identifier "conf". Thus, the contents of the element 812 is captured at block 620. As indicated by dashed lines in FIG. 8, the "div" element 812 contains data defining information shown on the display 212 defining a hotel room reservation. Other portions of the web page 500, such as an image tag 816, are not captured. In other examples, the extension 224 is configured to capture a portion of the web page 500 by automatically capturing an image (e.g. a screenshot) of the web page. Capturing a portion of a web page is discussed in greater detail below in connection with FIG. 9. As will be apparent to those skilled in the art, while the discussion below relates to capturing the image based on operator input, the extension 224 may also perform the capture automatically.

As noted earlier in connection with block 610, the processing of data captured at block 620 will be described further below, after a description of the remaining capture mechanism implemented by the extension 224.

When the determination at block 615 is negative, indicating that neither predefined tags nor predefined vendor-specific attributes were located in the web page source, the extension 224 proceeds to block 625. At block 625 the extension is configured to receive a capture command via the input assembly 216. Specifically, the customer 108 operating the customer device 112 may select the selectable capture element 516 via the input assembly 216 to initiate the performance of block 625.

Figure 9:
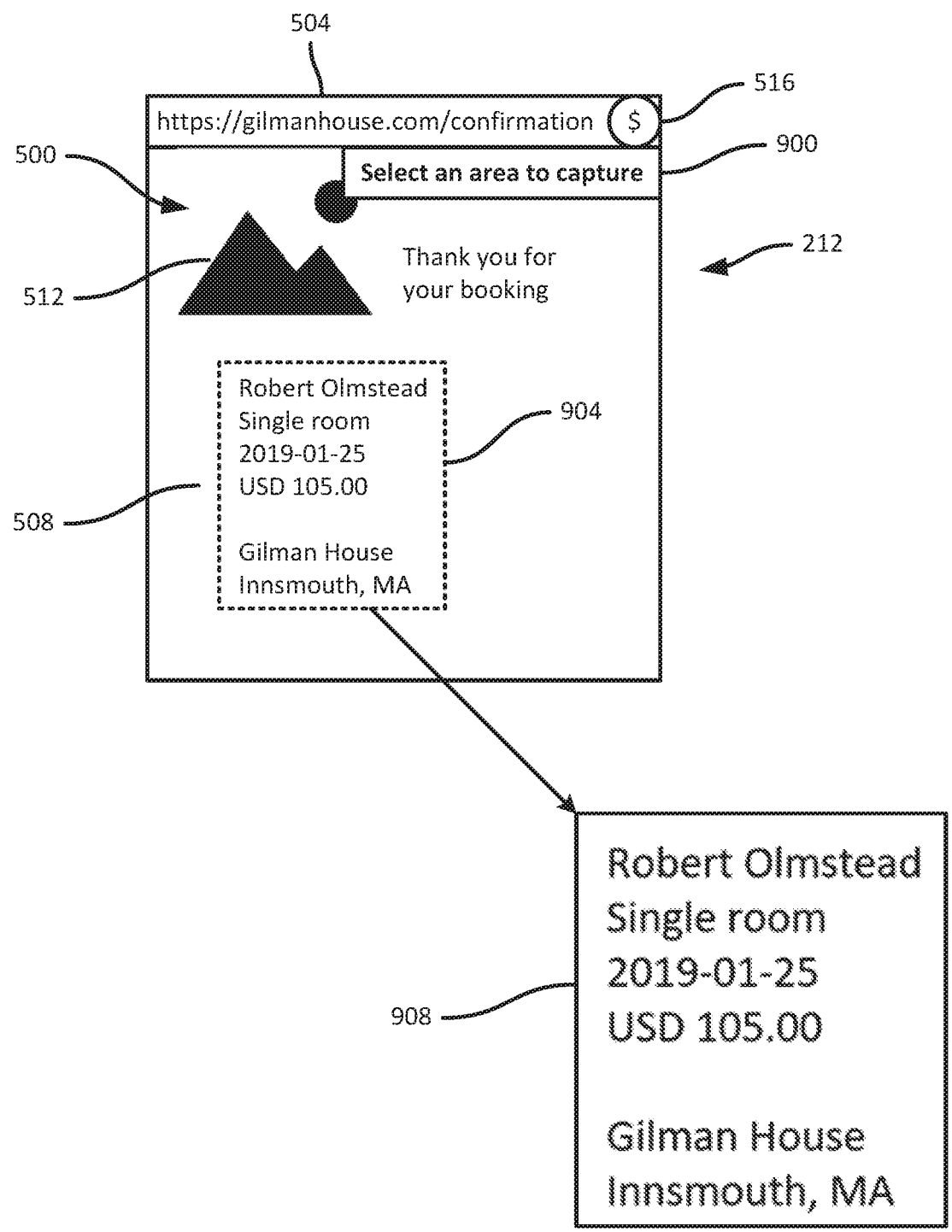
FIG. 9 illustrates a further mechanism of capturing portions of the web page of FIG. 5 containing target data via the method of FIG. 6.

Responsive to selection of the element 516, the extension 224 awaits further input from the input assembly 216 for the selection of a portion of the web page 500 as presented on the display 212. Turning to FIG. 9, the extension 224 may also cause a prompt 900 to be presented on the display 212 instructing the operator of the customer device 112 (e.g. the customer 108) to select a portion of the web page 500 as presented on the display 212, e.g. by drawing or otherwise generating a selection box 904 on the display 212. Generation of the selection box 904 causes the extension 224 to capture the portion of the web page 500 within the box 904. In the present example, the extension 224 generates an image (e.g. a raster image, such as a Portable Network Graphic (PNG) image or other suitable image format) 908 depicting the captured portion of the web page 500. In other examples, the extension 224 is configured to select the corresponding portion of the underlying DOM of the web page 500 rather than to generate the image 908.

In this example, it is assumed that blocks 605 and 615 are performed automatically, and that the element 516 serves only to initiate this third capture mechanism. In other examples, however, the element 516 is selectable to initiate the performance of the method of FIG. 6 in its entirety. That is, the extension 224 can be configured to begin assessing the web page 500 at block 605 only when the element 516 has been selected. In such examples, negative determinations at blocks 605 and 615 can lead to the automatic presentation of the prompt 900 and initiation of the screen capture behavior discussed above.

Returning to FIG. 6, at block 630 the extension 224 is configured to determine whether to transmit the captured portion of the web page 500 from blocks 610, 620 or 625 to the intermediation server 128 for parsing in order to obtain the target data according to a common predetermined format. In the present example, referring to FIG. 10, the extension 224 is configured to generate a prompt 1000 on the display 212 indicating to the customer 108 that target data (in the present example, invoice data for potential submission as an expense to the EMS 124) has been detected. The prompt 1000 includes selectable options 1004 and 1008 to, respectively, proceed with transmission to the server 128 and cease the performance of the method 300. When the option 1004 is selected, the determination at block 630 is affirmative, and when the option 1008 is selected, the determination at block 630 is negative and the process ends.

Figure 10:
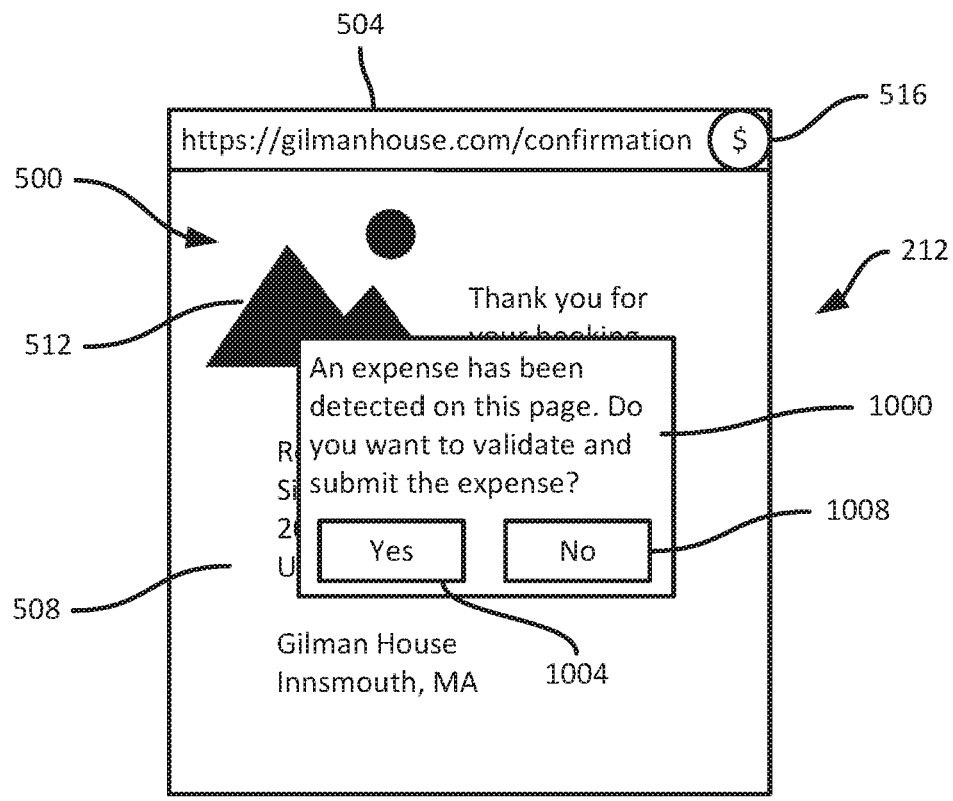
FIG. 10 illustrates a submission prompt generated by the customer device of FIG. 1.

The prompt 1000 shown in FIG. 10 need not always be presented at block 630. For example, in some embodiments the determination at block 630 is simply omitted, and the extension 224 proceeds automatically to block 635. In other embodiments, the prompt 1000 is presented only when blocks 605 and/or 615 were performed automatically, without explicit instruction from the customer (e.g. via selection of the element 516), and resulted in the detection of target data. When a portion of the web page 500 is captured responsive to an explicit instruction from the customer 108, e.g. via the selection of the element 516, the prompt 1000 can be omitted.

When the determination at block 630 is affirmative, at block 635 the extension 224 transmits the captured portion of the web page 500 to the intermediation server 128, and in return receives the target data in the above-mentioned common format. The transmission to the intermediation server 128 can employ an API call provided by the intermediation server 128 (e.g. a "checkReceipt" command). In some examples, dedicated API calls can be employed by the extension 224 depending on the nature of the captured data. For example, data captured at block 610 can be transmitted using the above "checkReceipt" command, while data captured at block 620 can be transmitted using a "checkVendor" command, and data captured at block 625 can be transmitted using a "checkScreenshot" command.

In other words, in the present example, the intermediation server 128 receives the captured portion of the web page 500 from the customer device 112 and parses the captured portion in order to extract the target data and place the target data in a common format, such as in the form of the JSON object mentioned earlier. Returning to FIG. 4, at block 410 the server 128 receives a parsing request from the customer device 112 (specifically, from the extension 224) containing the captured portion of the web page 500. At block 415 the intermediation server 128 obtains the target data according to the predefined common format, and returns the target data to the customer device 112.

Generation of the target data by the intermediation server 128 can be accomplished according to a variety of mechanisms, depending at least in part on the form of the captured portion of the web page 500 received from the customer device 112. For example, if the captured portion is received in the form of metadata tags (i.e. selected from the source 700 shown in FIG. 7), the intermediation server 128 is configured to map the information from the metadata tags to a predefined set of fields in the common format. In some examples, such as that shown in FIG. 7, the captured data itself includes URLs for both a JSON object and a document (e.g. a PDF document) corresponding to the target data. The intermediation server 128 can retrieve either or both of the JSON object and the document directly from the vendor server 116 employing the above URLs. The intermediation server 128 can also, when a JSON object is retrieved, verify (using the above-mentioned mapping) that the content of the retrieved object matches the content of the metadata tags themselves.

When the captured web page data includes a selected portion of a web page source (arising from block 620 of FIG. 6), the intermediation server 128 can apply a set of parsing rules to extract the target data. For example, the intermediation server 128 can store sets of parsing rules for each vendor, similarly to the vendor-specific rulesets 804 discussed in connection with FIG. 8 above. Each set of parsing rules defines, for a given vendor (e.g. identified by domain name and page title as discussed above), a mapping between page source attributes and fields in the common format employed for the target data. For example, referring briefly to FIG. 8, such a mapping can specify that the fourth line of the "div" element 812 (lines may be separated by line break elements, e.g. "<br>" tags) contains three characters specifying a currency to be inserted into a currency field in the common target data format, followed by a price to be inserted into a price field in the common target data format.

When the captured web page data includes a screenshot such as the image 908, the intermediation server 128 may transmit a parsing request to the auxiliary server 132, which can implement optical character recognition (OCR) mechanisms and any other suitable interpretation algorithms to detect and return the target data to the intermediation server 128. In other examples, the intermediation server 128 itself can perform the extraction of target data from the image 908.

The intermediation server 128 may therefore maintain a plurality of configuration settings, each enabling the intermediation server 128 to generate target data from a different form of captured web page data. The intermediation server 128 can select from the configuration settings by detecting the form of the captured web page data received (e.g. by detecting whether the captured data contains metadata tags, portions of a web page DOM, or an image corresponding to data captured at blocks 610, 620 and 625 respectively). In other examples, the intermediation server 128 can select the appropriate configuration settings according to which of the above-mentioned API calls was used by the extension 224 to submit the captured data at block 635.

The intermediation server 128 is configured, having obtained the target data, to store the target data in the invoice repository 266, along with any supplemental data such as retrieved PDF documents or the like. Table 2 below provides an example of target data obtained as a result of the performance of block 415. As shown below, the target data also includes a "status" field that does not arise from the web page 500 itself, but instead that reflects a degree of progress of the target data through the performance of the methods 300 and 400.

TABLE 2

Example Target Data

| Attribute | Sub-attribute | Value |
| --- | --- | --- |
| Account ID |  | Cust112 |
| ID |  | hfy7-fgk4 |
| URL |  | https://gilmanhouse.com/receipts/hfy7-fgk4.json |
| Document |  | https://gilmanhouse.com/receipts/hfy7-fgk4.pdf |
| Vendor |  |  |
|  | Name | Gilman House Hotel |
|  | Address | Innsmouth, MA, USA |
| Total |  |  |
|  | Amount | 105.00 |
|  | Currency | USD |
| Date |  | Jan. 1, 2019 |
| Status |  | Pending |

Returning to FIG. 3, at block 320 the customer device 112 is therefore configured to receive the target data, for example in the common format depicted above (or any other suitable common format). The customer device 112 can also receive from the intermediation server a document (e.g. a PDF document) containing the target data, the document having been retrieved from the vendor server 116 by the intermediation server as noted above. In other examples, the extension 224 can retrieve such a document for local storage from the vendor server 116 using a URL value contained in the target data.

In other examples, the extension 224 itself generates the target data, rather than transmitting the captured web page data to the intermediation server 128 for parsing. In still other examples, certain parsing actions are performed by the extension 224 (e.g. the parsing of metadata tags), while others (e.g. the parsing of image-based captured data) are performed by the intermediation server 128.

Figure 11:
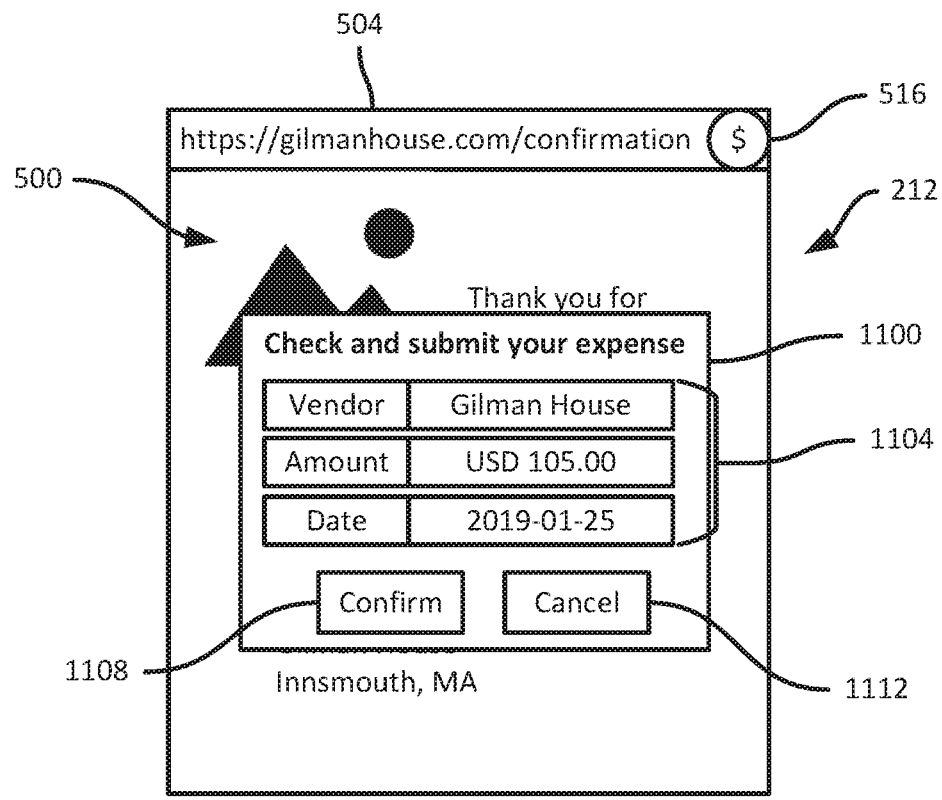
FIG. 11 illustrates a target data overlay generated by the customer device of FIG. 1.

Having received or generated the target data, the customer device 112, via execution of the extension 224, automatically generates an overlay interface that includes at least a portion of the target data, and presents the overlay on the display 212. Turning to FIG. 11, an example overlay 1100 is shown within the browser window on the display 212. The overlay 1100 includes at least a portion of the target data: in the illustrated example, the vendor name, amount and date of the transaction in editable fields 1104.

At block 325, the extension receives an operator command to either edit the target data presented in the overlay 1100, confirm (i.e. accept) the target data as currently presented, or reject the target data. Referring again to FIG. 11, any of the fields 1104 can be selected for editing, following which input received via the input assembly 216 can be employed to update the content of the fields 1104. Editing of fields may be employed to correct incorrectly parsed target data, supplement the target data, or the like. Following the receipt of updated target data, at block 335 the extension 224 updates the overlay via another performance of block 325.

As seen in FIG. 11, the overlay 1100 includes a selectable confirmation button 1108 and a selectable cancelation button 1112. Responsive to selection of the button 1112 the extension 224 proceeds to block 340 to discard the target data and remove the overlay 1100. The cancelation button 1112, in other words, generates a rejection command that aborts the process of extracting and submitting the target data to the EMS 124. At block 340 the extension 224 may also transmit an instruction to the intermediation server 128 to discard the target data from the invoice repository 266.

Responsive to selected of the button 1008, which indicates confirmation or acceptance of the target data, the extension 224 proceeds to block 345. At block 345 the extension transmits the target data (including an edits thereto received at block 335) to the intermediation server 128. The transmission at block 345 is distinguished from the transmission at block 635, for example, by the use of a distinct API call such as a "pushReceipt" call rather than the above-mentioned "check . . . " API calls.

Referring to FIG. 4, at block 420 the intermediation server 128 receives the target data transmitted at block 345 by the customer device 112. The server 128 can compare the received data to the corresponding data stored in the invoice repository 266, and update the repository 266 in the event that the target data was updated at the customer device 112.

At block 425, the intermediation server 128 generates and transmits an electronic receipt to a selected EMS. In the present example, the electronic receipt is transmitted to the EMS 124; in embodiments where multiple EMSs are available, the appropriate EMS is selected according to the account identifier associated with the target data, and the EMS associated with that account identifier in the profile repository 262. The electronic receipt transmitted at block 425 can simply be the above-mentioned target data in the common format (e.g. the JSON object discussed above). In some embodiments, however, the intermediation server 128 maintains distinct vendor-specific receipt formats (e.g. in the profile repository 262), and maps the target data from the common format noted above to the appropriate one of the vendor-specific receipt formats before transmission at block 425.

At block 430, the intermediation server 128 returns a confirmation message to the customer device 112. The confirmation message, e.g. indicating that the target data has been submitted, can be rendered on the display 112 as a further overlay by the extension 224. The intermediation server 128 can also update the invoice repository 266 to indicate a change in status, e.g. from "pending" to "submitted" or the like. In some examples, prior to sending the confirmation at block 430, the intermediation server 128 awaits a reply from the EMS 124 indicating successful receipt and/or processing of the target data. For example, if the EMS 124 is configured to automatically process and approve or reject expenses, the EMS 124 may return a message to the intermediation server 128 indicating whether the expense defined by the target data has been approved. Such an indication can be returned to the customer device 112 at block 430. In such embodiments, the message returned at block 430 can also include payment data, such as a virtual card number (VCN) to effect payment for the transaction.

Those skilled in the art will appreciate that in some embodiments, the functionality of the applications 220, 224 and 270 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of browser-based target data extraction at a client computing device, the method comprising:
    storing, in a memory of the client computing device, a browser application and a browser extension, the browser extension containing a predefined network identifier of a server;
    at a controller of the client computing device interconnected with the memory, executing the browser application to retrieve a web page containing target data;
    at the controller, responsive to retrieving the web page, executing the browser extension simultaneously with the browser application for:
        capturing a portion of the web page containing the target data;
        responsive to capturing the portion, automatically generating an overlay interface including the target data;
        controlling a display of the client computing device to present the overlay with the web page;
        receiving an operator command at the overlay via an input assembly of the client computing device; and
        when the operator command is a confirmation command, transmitting the target data to the server using the predefined network identifier.

2. The method of claim 1, further comprising, at the controller via execution of the browser extension: when the operator command is a rejection command, ceasing display of the overlay and discarding the target data, without transmitting the target data to the server.

3. The method of claim 1, further comprising, at the controller via execution of the browser extension:
    prior to the capturing, detecting a feature of the web page indicating that the web page contains the target data.

4. The method of claim 3, further comprising:
    storing in the memory, in association with the browser extension, a predefined tag corresponding to the target data;
    wherein detecting the feature includes examining metadata of the web page to detect the predefined tag; and
    wherein capturing the target data includes retrieving a portion of the metadata associated with the predefined tag.

5. The method of claim 3, further comprising:
    storing in the memory, in association with the browser extension, a predefined web page attribute indicating the presence of the target data;
    wherein detecting the feature includes examining a document object model (DOM) of the web page to detect the predefined web page attribute; and
    wherein capturing the target data includes retrieving a portion of the DOM.

6. The method of claim 5, wherein the predefined web page attribute includes at least one of a domain of the web page and a title of the web page.

7. The method of claim 1, wherein capturing the portion of the web page includes, via execution of the browser extension:
    receiving a capture command via the input assembly;
    receiving a selection of the portion of the web page via the input assembly; and
    capturing the selected portion.

8. The method of claim 1, wherein the target data includes invoice data defining a price payable to a vendor for supplying a product to a customer associated with the client computing device.

9. The method of claim 1, further comprising, prior to receiving the operator command: receiving input data at the overlay altering the target data prior to transmission to the server.

10. The method of claim 1, further comprising, at the controller via execution of the browser extension:
    prior to generating the overlay, transmitting a parsing request to the server including the capture portion of the web page; and
    receiving the target data from the server.

11. The method of claim 1, further comprising, at the controller via execution of the browser extension:
    prior to generating the overlay, parsing the captured portion of the web page to extract the target data.

12. A client computing device, comprising:
    a memory storing a browser application and a browser extension, the browser extension containing a predefined network identifier of a server;
    a display;
    an input assembly; and
    a controller interconnected with the memory, the display and the input assembly; the controller configured to perform the method of claim 1.

13. A system for browser-based target data extraction, the system comprising:
    a client computing device including:
        a memory storing a browser application and a browser extension, the browser extension containing a predefined network identifier of a server;
        a display;
        an input assembly; and
        a controller interconnected with the memory, the display and the input assembly; the controller configured to perform the method of claim 1; and a server corresponding to the predefined network identifier, the server comprising a communication interface and a processor configured to:
receive the target data from the client computing device;
generate an electronic receipt according to the target data; and
transmit the electronic receipt to an expense subsystem.

14. The system of claim 13, wherein the processor is further configured to:
generate and transmit a confirmation message to the client computing device responsive to transmitting the electronic receipt to the expense subsystem; and
wherein the controller of the client computing device is further configured to control the display to present the confirmation message at the overlay.

15. The system of claim 13, wherein the processor is further configured, prior to receiving the target data from the client computing device, to:
receive a parsing request containing the captured portion of the web page;
parse the captured portion to extract the target data; and
return the target data to the client computing device for display via the overlay.

16. The system of claim 15, wherein the processor is configured, in order to parse the captured portion of the web page, to transmit the captured portion of the web page to an auxiliary server for parsing.

17. The system of claim 15, wherein the processor is further configured, responsive to receiving the parsing request, to detect a network address of a target document in the captured portion, and to retrieve the target document from a vendor server.

18. The system of claim 15, wherein the controller of the client computing device is further configured, via execution of the browser extension, to transmit an authentication request to the server.

19. The system of claim 18, wherein the processor of the server is further configured, responsive to receiving the authentication request, to generate and transmit an authentication token to the client computing device.

* * * * *